United States Patent
Ostler et al.

(10) Patent No.: US 6,782,447 B2
(45) Date of Patent: Aug. 24, 2004

(54) CIRCULAR ADDRESS REGISTER

(75) Inventors: Farrell L. Ostler, Albuquerque, NM (US); Antoine Farid Dagher, Albuquerque, NM (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/466,404

(22) Filed: Dec. 17, 1999

(65) Prior Publication Data

US 2003/0105917 A1 Jun. 5, 2003

(51) Int. Cl.$^7$ .............................. G06F 12/06; G06F 9/355
(52) U.S. Cl. ..................... 711/110; 711/220; 711/201; 711/218; 711/219
(58) Field of Search ........................... 711/110, 201–202, 711/210, 217–220; 712/204, 221, 225; 708/533, 670; 710/54–57, 52

(56) References Cited

U.S. PATENT DOCUMENTS

| | | | | |
|---|---|---|---|---|
| 4,202,035 A | * | 5/1980 | Lane ........................... | 711/217 |
| 4,809,156 A | | 2/1989 | Taber .......................... | 711/217 |
| 4,908,748 A | | 3/1990 | Pathak et al. ................ | 711/220 |
| 5,032,986 A | * | 7/1991 | Pathak et al. ................ | 711/217 |
| 5,623,621 A | | 4/1997 | Garde ......................... | 711/220 |
| 5,649,146 A | * | 7/1997 | Riou ........................... | 711/217 |
| 5,659,698 A | * | 8/1997 | Weng et al. ................. | 711/220 |
| 5,659,700 A | | 8/1997 | Chen et al. .................. | 711/217 |
| 5,983,333 A | * | 11/1999 | Kolagotla .................... | 711/219 |

OTHER PUBLICATIONS

"Circular Addressing Circuitry for Accessing Computer Storage", IBM Technical Disclosure Bulletin, vol. 20, No. 2, Jul. 1977, pp. 871–872.

* cited by examiner

*Primary Examiner*—Denise Tran
(74) *Attorney, Agent, or Firm*—Michael J. Ure

(57) ABSTRACT

A device and corresponding programming instructions are provided that facilitate a circular addressing process. The device is configured to provide an address output that is constrained to lie within specified bounds. When a "circular increment" or "circular decrement" instruction is executed that would cause the address to exceed a bound, the address is reset to the other bound. In a preferred embodiment, the programming instruction also sets condition flags that indicate when the address is at each bound. By providing these "bounds" flags in conjunction with the circular addressing operation, multiple-word data items can be processed efficiently. A base-address of N contiguous words in a memory is loaded into the circular register, and a circular addressing instruction is used to access each word of the N contiguous words in sequence; a bounds flag is set when the last word of the multi-word data item is accessed.

14 Claims, 1 Drawing Sheet

CIRCULAR ADDRESS REGISTER

BACKGROUND OF THE INVENTION

1. Field of the Invention

This invention relates to the field of computer and programming systems, and in particular to the programming of systems that employ circular lists or iteratively process multiple-word operands.

2. Description of Related Art

Circular lists are often used to implement First-In, First-Out (FIFO) buffers. The FIFO model represents a list of items wherein new items are added to the top of the list, and old items are removed from the bottom of the list. In effect, the FIFO is structured as a list of L data items; when a data item is added to the list, it is given the next available address of L+1; when a data item is removed from the list, the address of each data item remaining in the list is decremented by one. The moving of each remaining data item down in the list each time a data item is removed from the list, however, is inefficient. Instead, the defined "bottom" of the list is moved up by one each time a data item is removed. The logical address of each data-item in the list is defined by its distance from this defined bottom of the list, rather than by its physical location in the continually growing list. Even though the "removed" data items may remain in the physical locations below the "bottom" of the list, they are no longer within the logical address space of the list, and are no longer considered to be a part of the list of L items. As would be evident to one of ordinary skill in the art, the continued advancement of the physical location used for each added data item, without a corresponding physical relocation of each data item to lower physical locations as data items are removed, will eventually exhaust the physical resources used to contain these data items.

A circular list is embodied as N contiguous physical memory locations, and a corresponding controlling mechanism that adds new data items to the list, starting at the beginning of the physical memory locations, and continuing to each next available physical location until the end of the contiguous locations is reached. When the next data item arrives after reaching the end of the contiguous locations, this next data item is placed at the beginning of the contiguous locations, replacing the prior data item that was stored at the beginning of the contiguous locations. Each next data item is placed into each next physical location, replacing the data items previously stored at each next physical location, until the end of the contiguous locations is again exceeded, at which point the next data item is placed at the beginning of the contiguous locations. This process continues ad infinitum without consuming more than the N contiguous physical memory locations at any time. Note, however, that the prior data items that are being replaced by the next data items must have been data items that were conceptually "removed" from the list. That is, at no time can the logical length of the list, L, exceed the physical length of the contiguous locations N. In a typical embodiment, the controlling mechanism maintains a pointer to the logical "bottom" of the list, and updates it accordingly as each data item is removed from the list, and also maintains a pointer to the logical "top" of the list, and updates it accordingly as each data item is added to the list. The controlling mechanism also inhibits the addition of a new data item when the "top" of the list becomes coincident with the "bottom" of the list, and waits for the "bottom" of the list to be advanced (by a removal of the oldest item in the list) before placing the new data item into the list.

Typically, multiple programming instructions are required to control the incrementing and decrementing of a pointer that is associated with a circular list. The instructions must test whether the pointer has gone beyond the upper or lower bounds of the physically contiguous memory locations, and adjust the pointer accordingly to provide the circular addressing effect.

BRIEF SUMMARY OF THE INVENTION

It is an object of this invention to provide a device that facilitates the use of circular lists. It is a further object of this invention to ease the task of programming a device to facilitate the use of circular lists. It is a further object of this invention to ease the task of programming a device to facilitate the use of multiple-word data items by modeling the multiple-word data items as circular addressing process.

These objects and others are achieved by providing a device and corresponding programming instructions that facilitate a circular addressing process. The device is configured to provide an address output that is constrained to lie within specified bounds. When a "circular increment" or "circular decrement" instruction is executed that would cause the address to exceed a bound, the address is reset to the other bound. In a preferred embodiment, the programming instruction also sets condition flags that indicate when the address is at each bound. By providing these "bounds" flags in conjunction with the circular addressing operation, multiple-word data items can be processed efficiently. A base-address of N contiguous words in a memory is loaded into the circular register, and a circular addressing instruction is used to access each word of the N contiguous words in sequence; a bounds flag is set when the last word of the multi-word data item is accessed. This bounds flag may thus be used to signal the end of processing of N words of a multi-word data item, and can be used to trigger a load of a next multi-word data item, or to trigger a next operation on the current data-item, and so on. Other condition flags are also provided to facilitate the processing of multi-word data-items.

BRIEF DESCRIPTION OF THE DRAWINGS

The invention is explained in further detail, and by way of example, with reference to the accompanying drawings wherein.

Throughout the drawings, the same reference numerals indicate similar or corresponding features or functions.

DETAILED DESCRIPTION OF THE INVENTION

Figure 1:
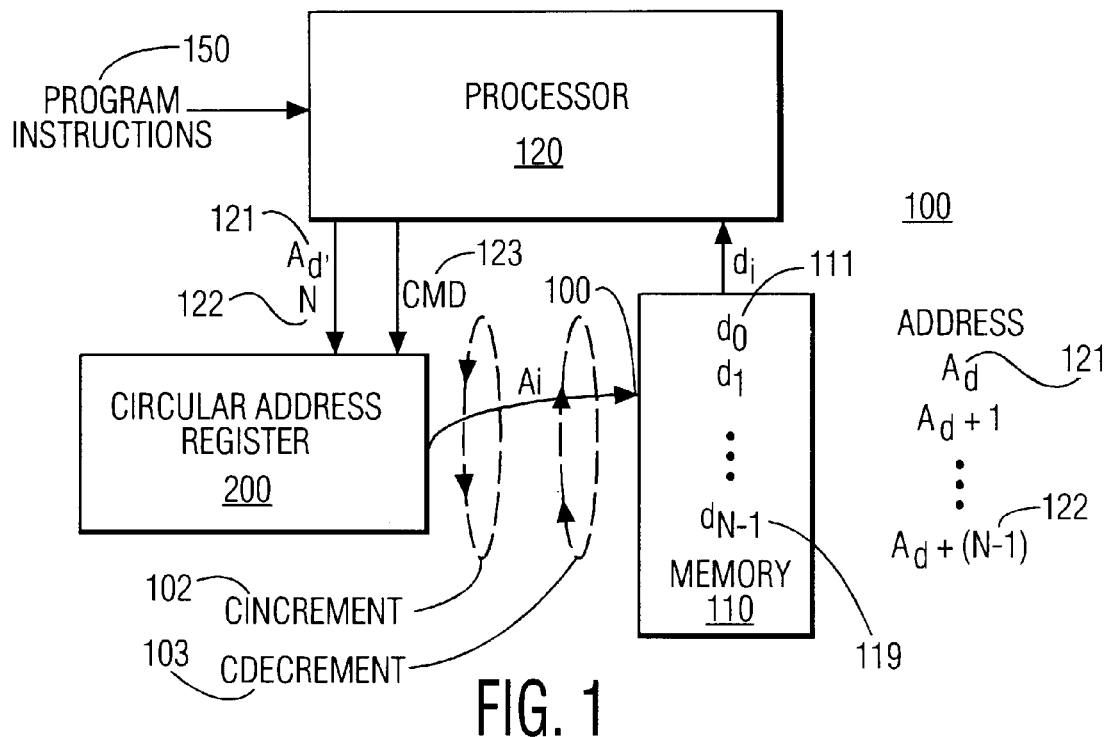
FIG. 1 illustrates an example block diagram of a processing system that provides circular addressing in accordance with this invention.

FIG. 1 illustrates a processing system 100 that includes a circular-address-register 200 that is used to access a memory 110 comprising contiguous storage elements $d_0$-$d_{N-1}$ 111–119 via a circular addressing scheme. The circular-address-register 200 provides an address 101 to the contiguous storage elements 111–119, corresponding, for example, to the aforementioned circular list. The address 101 contained in the circular-address-register 200 can be incremented 102 or decremented 103 to advance the pointer up or down the elements 111–119, respectively. The circular-address-register 200 is configured to determine an associated upper and lower bound corresponding to the range of the addresses of the memory elements 111–119. In a preferred embodiment, a base address $A_d$ 121 and a size N 122 are provided when the address register 200 is configured for processing the memory elements 111–119 as a circular list or buffer.

The processor 120 issues commands 123 to the circular-address-register 200 to effect desired operations, in response to program instructions 150. The following commands 123 are applicable to the address register 200 in accordance with this invention:

| OPERATION | | EFFECT | |
|---|---|---|---|
| Circular Increment (102) | If Address >=? $A_d$ + (N − 1) | Then Address = $A_d$ Else Address = Address + 1. | |
| Circular Decrement (103) | If Address <=? $A_d$ | Then Address = $A_d$ + (N − 1) Else Address = Address − 1. | |

Note that the numeral "1" is used herein for ease of illustration. As is common in the art, the size of a "word" may differ from the scale that is used for addressing the elements $d_0$-$d_N$ 111–119. That is, for example, the address 101 may be specified in terms of 8-bit bytes or 16-bit words, while the elements $d_0$-$d_{N-1}$ 111–119 may be configured to contain 32-bit words. As used herein, the term "word" is defined to be the size of the elements $d_0$-$d_{N-1}$ 111–119, and the increment and decrement of the address 101 contained in the circular-address-register 200 corresponds to a change of the address 101 by one word size.

A variety of embodiments of a circular-address-register that effects the above operations will be evident to one of ordinary skill in the art in view of this disclosure. In a preferred embodiment, both the circular increment operation and the circular decrement operation are provided, although a minimal embodiment may include one or the other. Also in a preferred embodiment, other operations are provided, as discussed below, to facilitate alternative and/or conventional uses of the circular-address-register 200. Note that a direct embodiment of the circular increment and decrement operations as defined above requires that the base address $A_d$ 121 and N 122 be stored, for comparison with the current address 101 contained in the circular-address-register 200.

Figure 2:
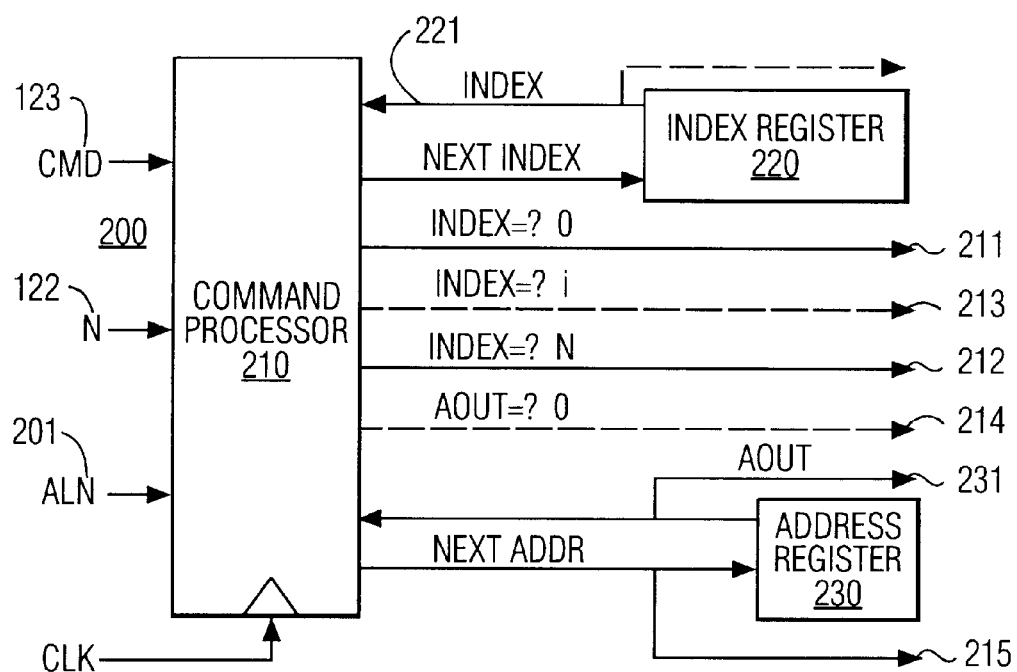
FIG. 2 illustrates an example block diagram of a circular-address-register in accordance with this invention.

FIG. 2 illustrates a preferred embodiment of the circular-address-register 200 in accordance with this invention. The circular-address-register 200 includes a command processor 210, an index register 220, and an address register 230. The address register 230 contains an address Aout 231 that can be used to effect a circular addressing technique. As applied to FIG. 1, the output address Aout 231 will typically correspond to the address 101 of an addressed memory element 111–119; a different reference numeral is utilized because, as discussed below, the circular-address-register 200 in accordance with this invention can be utilized for other applications, such as counting functions, in addition to a circular addressing function.

The index register 220 contains an index 221 that ranges from 0 to (N−i), and, in a circular addressing application, corresponds to the addressed memory element's position relative to a base address Ain 201. As applied to FIG. 1, the input base address Ain 201 will typically correspond to the base address $A_d$ 121 of a circular list, or, as discussed below, the base address of a multi-word data-item, or a count number. The parameter N 122 may be a fixed value, for a circular-address-register 200 that is configured for a particular application, or it may be a variable that is set when the circular-address-register is configured for a specific use. If N is fixed, it is contained within the circular-address-register 200, and need not be provided by the processor 120. The size of the index register 220 determines the maximum value of N 122; for example, if the index register 220 comprises three bits, N must be less than or equal to 8. In like manner, the size of the address register 230 determines the maximum range of addresses 231.

The command processor 210 in a preferred embodiment accepts the command input 123, and supports the following operations, in dependence upon this input 123:

| (1) | Load_L | Aout = Ain; | Index = 0. |
|---|---|---|---|
| (2) | Load_U | Aout = Ain; | Index = N − 1. |
| (3) | Circular Increment | If (Index =? (N − 1)) | Then Aout = Aout − (N − 1); Index = 0 Else Aout = Aout + 1; Index = Index + 1. |
| (4) | Circular Decrement | If (Index =? 0) | Then Aout = Aout + (N − 1); Index = (N − 1) Else Aout = Aout − 1; Index = Index − 1. |
| (5) | Increment | Aout = Aout + 1; | If (Index =? (N − 1)) Then Index = 0 Else Index = Index + 1. |
| (6) | Decrement | Aout = Aout − 1; | If (Index =? 0) Then Index = (N − 1) Else Index = 0. |

Operations (1) "Load_L" loads the address register 230 with the input address Ain 201; for ease of reference, this input address Ain 201 is hereinafter termed the base address, or lower bound of the address space, when used in the context of a circular addressing application. Operation (1) "Load_L" sets the index to 0, corresponding to the word at the lower bound of the address space.

Operations (2) "Load_U" loads the address register 230 with the upper bound of the address space Ain 201, and sets the index to N−1, corresponding to the word at the upper bound of the address space. These differing load operations (1) "Load_L" and (2) "Load_U" are provided to facilitate either low-to-high data access or high-to-low data access, by initializing the address and the index to each appropriate starting condition.

Operations (3) "Circular Increment" implements a circular increment addressing function. When the index is at its upper bound (index=N−1), the next circular increment operation (3) resets the address Aout 231 to the lower address bound, by subtracting N−1 from its current value, and resets the index to zero, corresponding to the word at the lower address bound. Otherwise, when the index is not at its upper bound, the next circular increment operation (3) increments the current contents of the address register and index register.

Operations (4) "Circular Decrement" implements a circular decrement addressing function. When the index is at its lower bound (index=0), the next circular decrement operation (4) resets the address Aout 231 to the upper address bound, by adding N−1 to its current value, and resets the index to N−1, corresponding to the word at the upper address bound. Otherwise, when the index is not at its lower bound, the next circular decrement operation (4) decrements the current contents of the address register and index register.

Operations (5) "Increment" implements a modified form of a conventional increment operation. The increment operation (5) increments Aout 231, without regard to an upper address bound, similar to a conventional register-increment operation. The increment operation (5) modifies the index in the same manner as the circular increment operation (3), thereby performing a "modulo N" up-counting function via the index.

Operations (6) "Decrement" implements a modified form of a conventional decrement operation. The decrement operation (6) decrements Aout 231, without regard to a lower address bound, similar to a conventional register-decrement operation. The decrement operation (6) modifies the index in the same manner as the circular decrement operation (4), thereby performing a "modulo N" down-counting function via the index.

Note that by utilizing the index register 220, a number of advantages are gained. A test for an index equal to zero (Index=? 0) can be implemented with fewer logic devices than a test for corresponding addresses (Address>=? $A_d$). Also, because the parameter N, the size of the list, is often substantially smaller in magnitude than the available address space, a test for an index equal to the upper bound of the index (Index=? N−1) can be implemented with fewer logic devices than a test for the upper bound of the address (Address>=? $A_d$+(N−1)). By providing the index register 220, and correlating its content with the content of the address register 230, the base address $A_d$ need not be retained, and, assuming that N is smaller than the address space, the overall storage requirements are reduced. Similarly, the addition or subtraction of (N−1) to the current contents of the address register Aout 231 to reset the address Aout 231 to the upper or lower bounds can typically be implemented with less circuitry and routing than an addition of (N−1) to the base address $A_d$, and a load of this sum into the address register 230.

The command processor 210 also provides the state of the
(Index =? 0) and
(Index =? N−1) comparisons as "bounds" condition flags 211, 212 that facilitate circular list and multi-word operations, as discussed below. Optionally, the command processor 210 could provide one or more flags 213 that identify other states of the index 221, including a separate flag for each value of the index 221. Also optionally, the index 221 could be provided as an output from the circular-address-register 200.

The bounds flags 211, 212 are provided to facilitate a processing of an N-word data item. When the last word of the N-word data item is accessed, at either the upper or lower address bound, depending upon whether the data item is being accessed in a low-to-high or high-to-low manner, the appropriate bounds flag 211, 212 is set. As would be evident to one of ordinary skill in the art, this set flag can be used to trigger the end of the N-word process, to commence another process on the N-word data item, or to load the contents of the memory elements 110–119 with a next N-word data item, and so on.

As discussed above, multiple address registers 200 are often utilized as registers that are configured to facilitate the processing of circular lists. For example, a pair of registers could be configured to provide the aforementioned "top" and "bottom" list pointers. Also, multiple address registers 200 can be configured for accessing multiple sets of memory elements 110–119, for example, to facilitate pipeline operations on multiple data items. As illustrated in FIG. 2, in a preferred embodiment, the next address 215 is also provided as an output from the circular-address-register, further facilitating pipeline operations; additional addresses, such as the next-next-address may also be provided to facilitate three-stage pipelines, and so on.

Although any register can be utilized as the index register 220 and the address register 230, special purpose registers are preferably utilized that are optimized to perform the circular addressing function. That is, for example, if the processing system is configured to process data items within a limited address space, the address register 230 need only be wide enough to accommodate this limited address space. In like manner, if the processing system is configured to process N-word data-items the index register 220 need only be wide enough to accommodate this size N, independent of the size of the address register.

The foregoing merely illustrates the principles of the invention. It will thus be appreciated that those skilled in the art will be able to devise various arrangements which, although not explicitly described or shown herein, embody the principles of the invention and are thus within its spirit and scope. For example, as illustrated in FIG. 2, an optional Aout=? 0 flag 214 may be provided to facilitate an efficient counter function in conjunction with the "Load_L" and "Decrement" or "Increment" operations. That is, the content of the address register 230 need not be an address pointer, and may be loaded with a count value M. Subsequent decrement operations will result in the Aout=? 0 being set, signaling a completion of M counts. These and other system configuration and optimization features will be evident to one of ordinary skill in the art in view of this disclosure, and are included within the scope of the following claims.

We claim:

1. A processing system comprising:
   a processor that is configured to execute program instructions,
   a circular-address-register having a command processor and an address register containing an address and an index register containing a count representing a displacement from a base-address loaded into a content of the circular-address-register, the circular-address-register being configured to determine an associated upper and lower bound and to receive commands from the processor,
   the commands comprising at least one of:
      a circular increment command that is configured to increment said content and said count, and, after said content reaches the upper bound, to reset both said content to the lower bound and said count, and
      a circular decrement command that is configured to decrement said content and said count, and, after said content reaches the lower bound, to reset both said content to the upper bound and said count;
      wherein the command processor is configured to update the address register and the index register according in dependence upon the commands and in dependence upon said count.

2. The processing system of claim 1, wherein the circular-address-register is configured to assert at least one bounds-flag when the content equals at least one of: the lower bound and the upper bound.

3. The processing system of claim 1, wherein the circular-address-register is further configured to assert a content-equal-zero flag when the content has a zero value.

4. The processing system of claim 1, further comprising a memory having contiguous memory elements with associated addresses that range between the upper and lower bounds.

5. The processing system of claim 1, wherein the received commands comprise both the circular increment and circular decrement commands.

6. The processing system of claim 5, wherein the lower bound corresponds to the index having a zero value, and the upper bound corresponds to the index having a specified value.

7. A process system comprising:
  a processor that is configured to execute program instructions,
  a circular-address-register having a command processor and an address register containing an address and an index register containing an index, that is configured to determine an associated upper and lower bound and to receive commands from the processor,
  the commands comprising at least one of:
    a circular increment command that is configured to increment a content of the circular-address-register and to reset the content to the lower bound after the content reaches the upper bound, and
    a circular decrement command that is configured to decrement the content of the circular-address-register and to reset the content to the upper bound after the content reaches the lower bound, and
    wherein the command processor is configured to update the address register and the index register according in dependence upon the commands and in dependence upon the index, the address register is configured to contain the content of the circular-address-register, the index register is configured to provide the index corresponding to the content of the circular-address-register relative to a base-address that is loaded into the content, the lower bound corresponds to the index having a zero value, the upper bound corresponds to the index having a specified value, the address register is minimally sized to contain a maximum upper bound, and the index register is minimally sized to contain a maximum specified value that differs from the maximum upper bound.

8. The processing system of claim 7, wherein the commands further include at least one of: an increment command that is configured to increment the content of the circular-address-register, independent of the upper bound, and a decrement command that is configured to decrement the content of the circular-address-register, independent of the lower bound.

9. The processing system of claim 8, wherein the circular-address-register is further configured to assert a content-equal-zero flag when the content has a zero value.

10. A process system comprising:
  a processor that is configured to execute program instructions;
  a circular-address-register having an associated upper and lower bound, that is configured to receive commands from the processor;
  the circular-address-register comprises:
    an address register that is configured to contain a content of the circular-address-register, and is minimally sized to contain a maximum upper bound, and
    an index register that is configured to provide an index corresponding to the content of the circular-address-register relative to a base-address that is loaded into the content, and is minimally sized to contain a maximum specified value that differs from the maximum upper bound, wherein the lower bound corresponds to the index having a zero value and the upper bound corresponds to the index having a specified value;
  the commands comprising at least one of:
    a circular increment command that is configured to increment the content of the circular-address-register and to reset the content to the lower bound after the content reaches the upper bound, and
    a circular decrement command that is configured to decrement the content of the circular-address-register and to reset the content to the upper bound after the content reaches the lower bound.

11. The processing system of claim 10, wherein the circular-address-register is configured to assert at least one bounds-flag when the content equals at least one of: the lower bound and the upper bound.

12. The processing system of claim 10, wherein the circular-address-register is further configured to assert a content-equal-zero flag when the content has a zero value.

13. The processing system of claim 10, further comprising a memory having continuous memory elements with associated addresses that range between the upper and lower bounds.

14. The processing system of claim 10, wherein the commands further include at least one of:
  an increment command that is configured to increment the content of the circular-address-register, independent of the upper bound, and
  a decrement command that is configured to decrement the content of the circular-address-register, independent of the lower bound.

* * * * *